United States Patent
Baek et al.

(10) Patent No.: US 12,224,416 B2
(45) Date of Patent: Feb. 11, 2025

(54) BATTERY MODULE AND BATTERY PACK INCLUDING THE SAME

(71) Applicant: LG ENERGY SOLUTION, LTD., Seoul (KR)

(72) Inventors: Seung Ryul Baek, Daejeon (KR); Jungmin Kwak, Daejeon (KR); Jaehong Jeong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 231 days.

(21) Appl. No.: 17/779,950

(22) PCT Filed: Mar. 2, 2021

(86) PCT No.: PCT/KR2021/002554
§ 371 (c)(1),
(2) Date: May 25, 2022

(87) PCT Pub. No.: WO2021/256661
PCT Pub. Date: Dec. 23, 2021

(65) Prior Publication Data
US 2023/0006274 A1  Jan. 5, 2023

(30) Foreign Application Priority Data

Jun. 19, 2020  (KR) ........................ 10-2020-0074749

(51) Int. Cl.
*H01M 10/653* (2014.01)
*H01M 10/613* (2014.01)
*H01M 50/211* (2021.01)
*H01M 50/271* (2021.01)

(52) U.S. Cl.
CPC ....... *H01M 10/653* (2015.04); *H01M 10/613* (2015.04); *H01M 50/211* (2021.01); *H01M 50/271* (2021.01)

(58) Field of Classification Search
None
See application file for complete search history.

(56) References Cited

U.S. PATENT DOCUMENTS

| | | |
|---|---|---|
| 2019/0051954 A1 | 2/2019 | Kim et al. |
| 2019/0067656 A1 | 2/2019 | Zhang et al. |
| 2019/0131596 A1 | 5/2019 | Yang et al. |

(Continued)

FOREIGN PATENT DOCUMENTS

| | | | |
|---|---|---|---|
| CN | 109428021 A | * 3/2019 | .......... H01M 10/613 |
| CN | 109994798 A | 7/2019 | |

(Continued)

*Primary Examiner* — Basia A Ridley
*Assistant Examiner* — Heng M. Chan
(74) *Attorney, Agent, or Firm* — Bryan Cave Leighton Paisner LLP

(57) ABSTRACT

A battery module according to the embodiment of the present disclosure includes a battery cell stack including a plurality of battery cells stacked in a first direction, a housing for the battery cell stack, a first thermally conductive resin layer located between the battery cell stack and a lower portion of the housing, and a second thermally conductive resin layer located between the battery cell stack and an upper portion of the housing, wherein at least one first injection hole for injecting a thermally conductive resin is formed in the upper portion of the housing.

11 Claims, 9 Drawing Sheets

(56) References Cited

U.S. PATENT DOCUMENTS

| | | | |
|---|---|---|---|
| 2019/0131678 A1 | 5/2019 | Kim et al. | |
| 2019/0198952 A1 | 6/2019 | Choi et al. | |
| 2020/0343607 A1 | 10/2020 | Kim et al. | |
| 2020/0411930 A1 | 12/2020 | Park et al. | |
| 2021/0028414 A1* | 1/2021 | Cho | H01M 50/227 |
| 2021/0057689 A1 | 2/2021 | Park et al. | |
| 2021/0151820 A1 | 5/2021 | Kim et al. | |
| 2022/0247004 A1 | 8/2022 | Yun | |

FOREIGN PATENT DOCUMENTS

| | | | | |
|---|---|---|---|---|
| JP | 2019-515461 A | 6/2019 | | |
| KR | 10-2014-0039350 A | 4/2014 | | |
| KR | 10-2018-0071800 A | 6/2018 | | |
| KR | 10-2018-0084539 A | 7/2018 | | |
| KR | 10-2018-0084540 A | 7/2018 | | |
| KR | 10-2019-0078521 A | 7/2019 | | |
| KR | 10-2019-0092835 A | 8/2019 | | |
| KR | 10-2019-0107900 A | 9/2019 | | |
| KR | 10-2020-0006140 A | 1/2020 | | |
| KR | 10-2020-0008624 A | 1/2020 | | |
| KR | 10-2020-0031930 A1 | 3/2020 | | |
| KR | 10-2020-0068479 A | 6/2020 | | |
| WO | WO-2019203431 A1 * | 10/2019 | | B60L 50/50 |
| WO | 2020/116825 A1 | 6/2020 | | |

* cited by examiner

[FIG. 1]
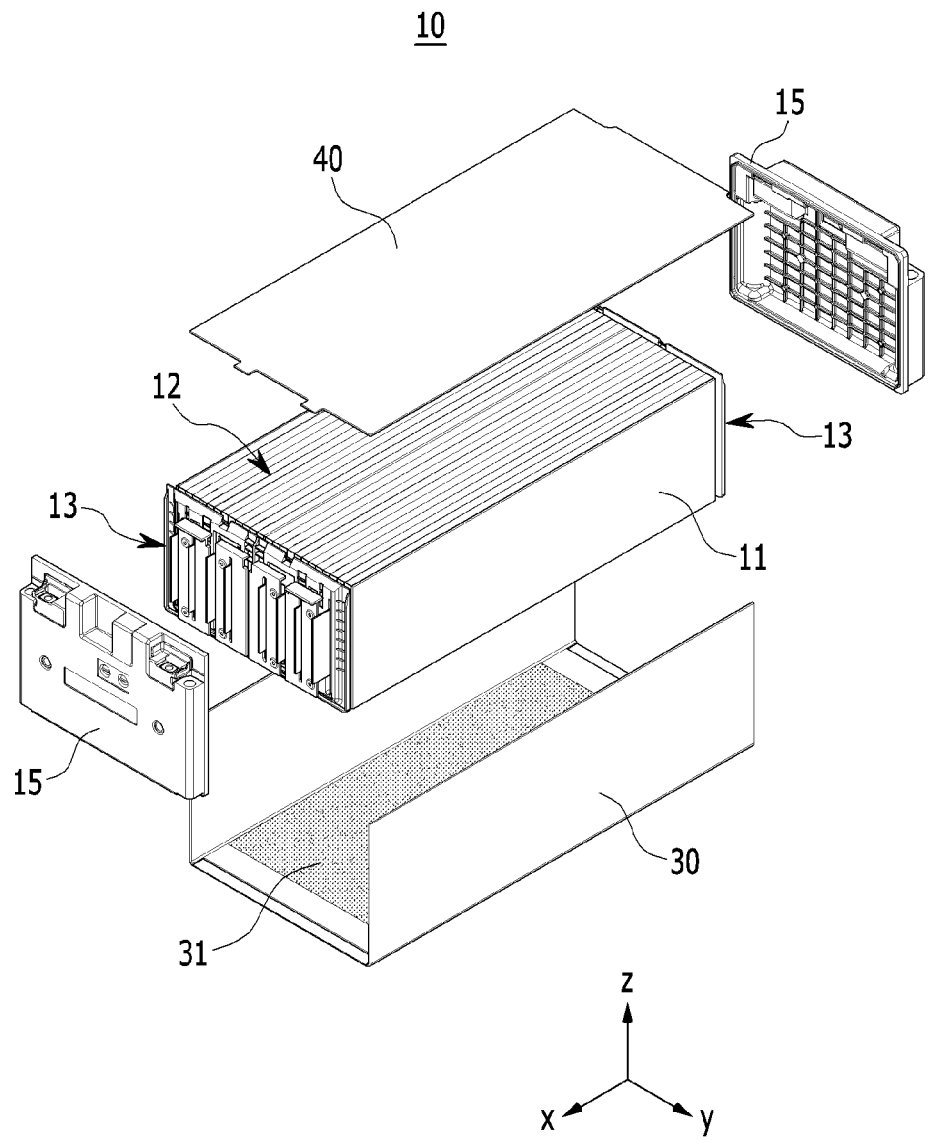

[FIG. 2]
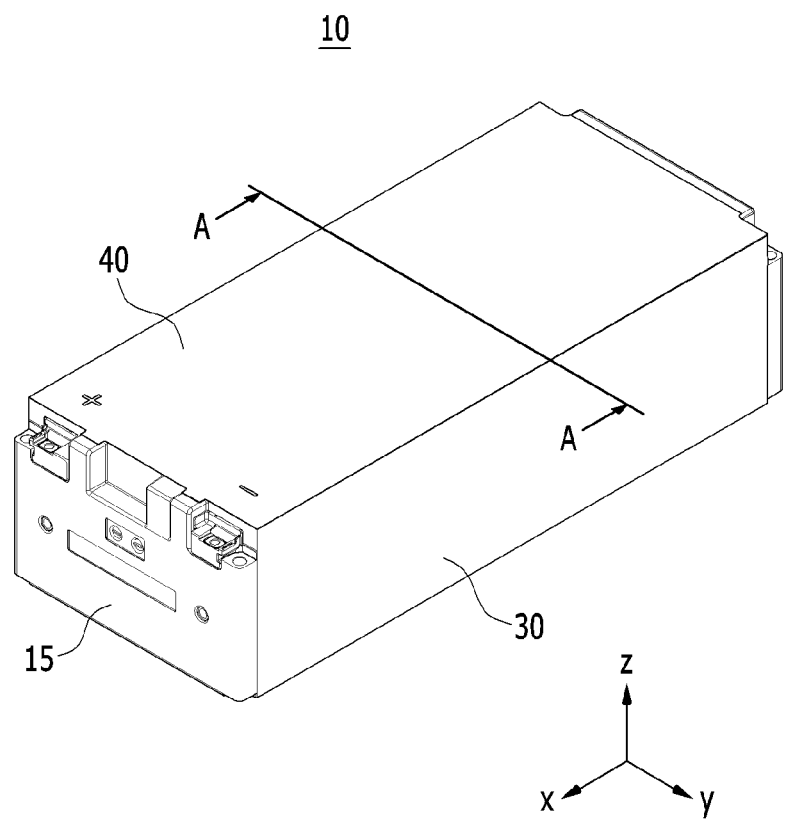

[FIG. 3]
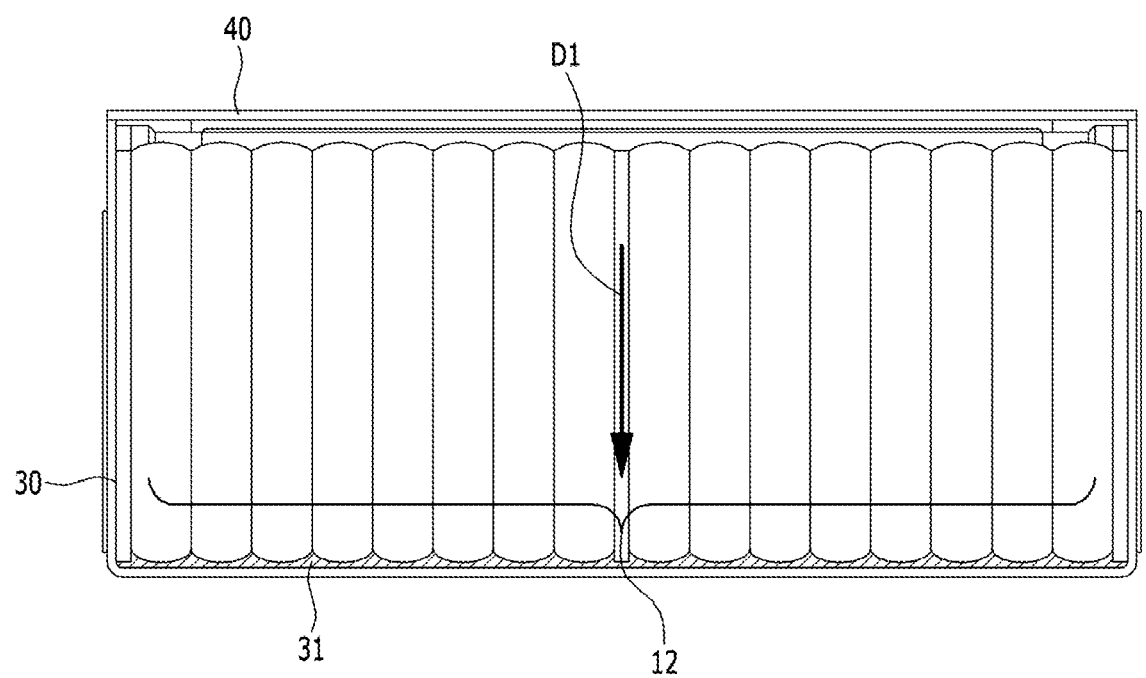

[FIG. 4]
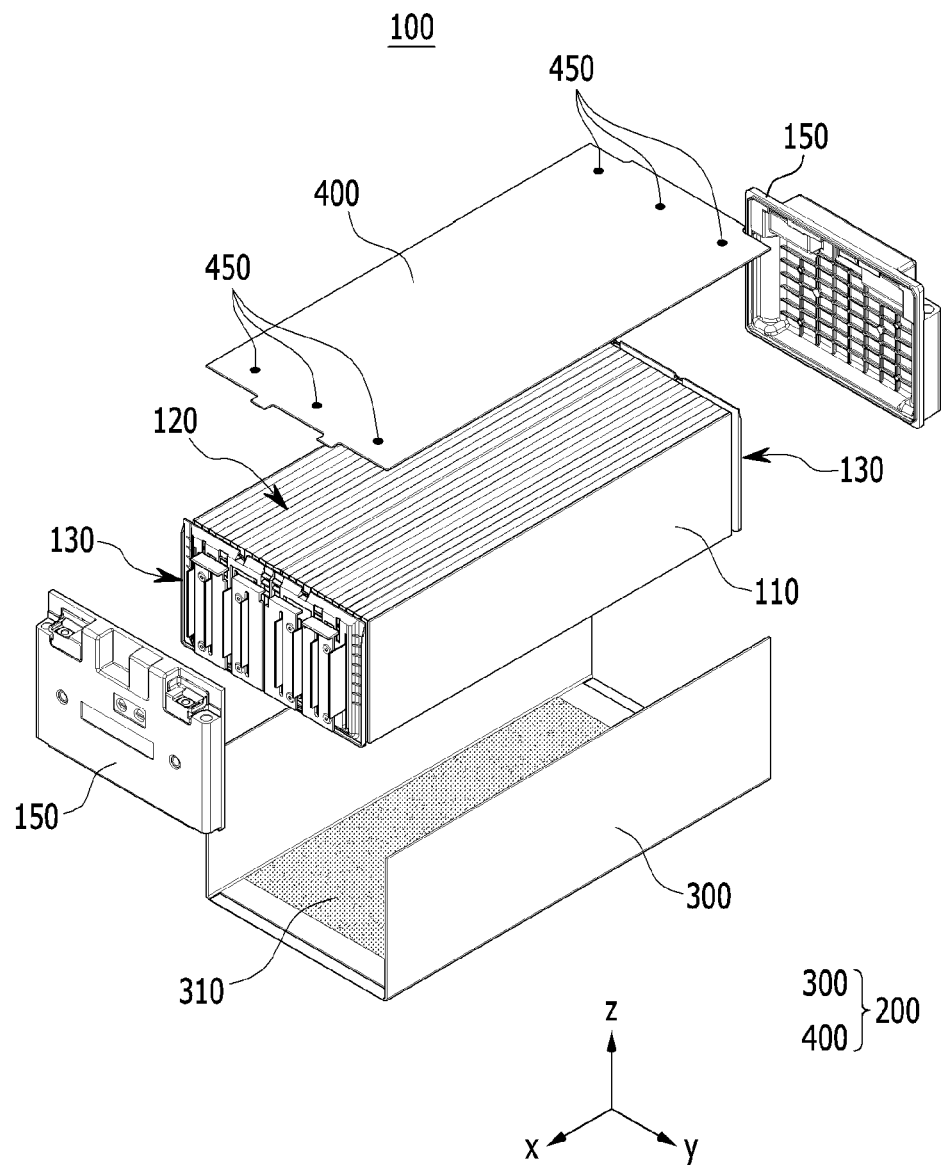

[FIG. 5]
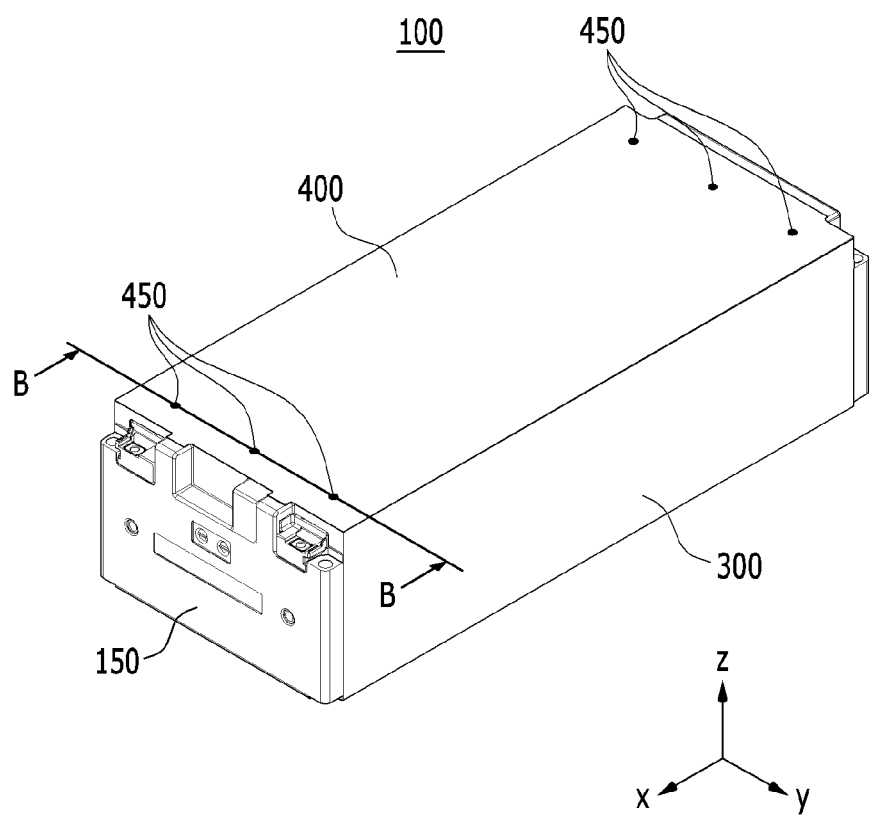

[FIG. 6]
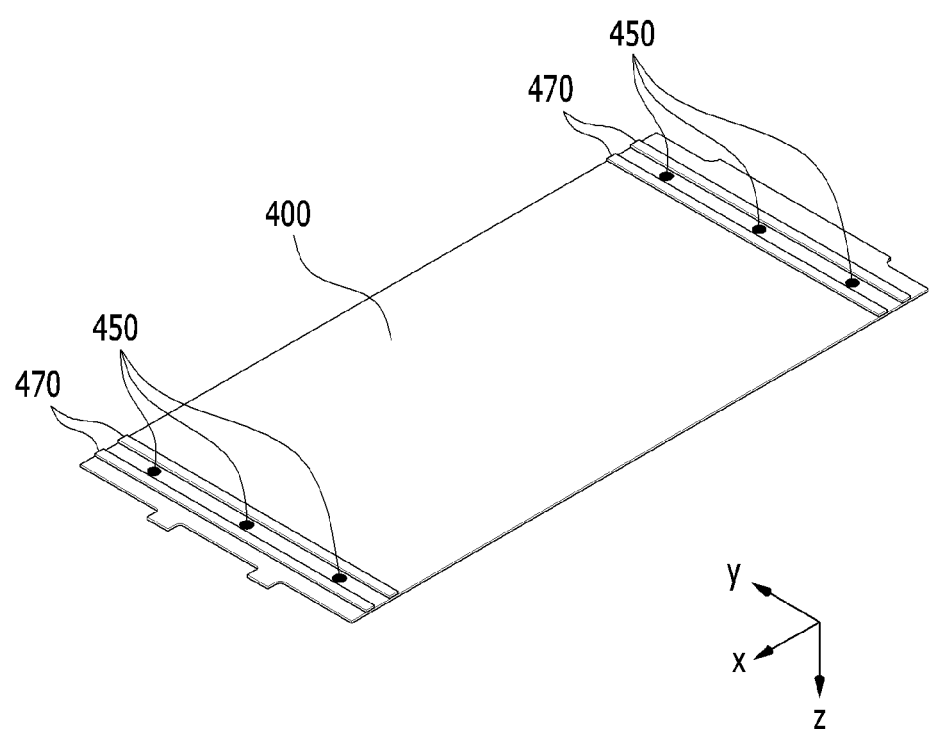

[FIG. 7]
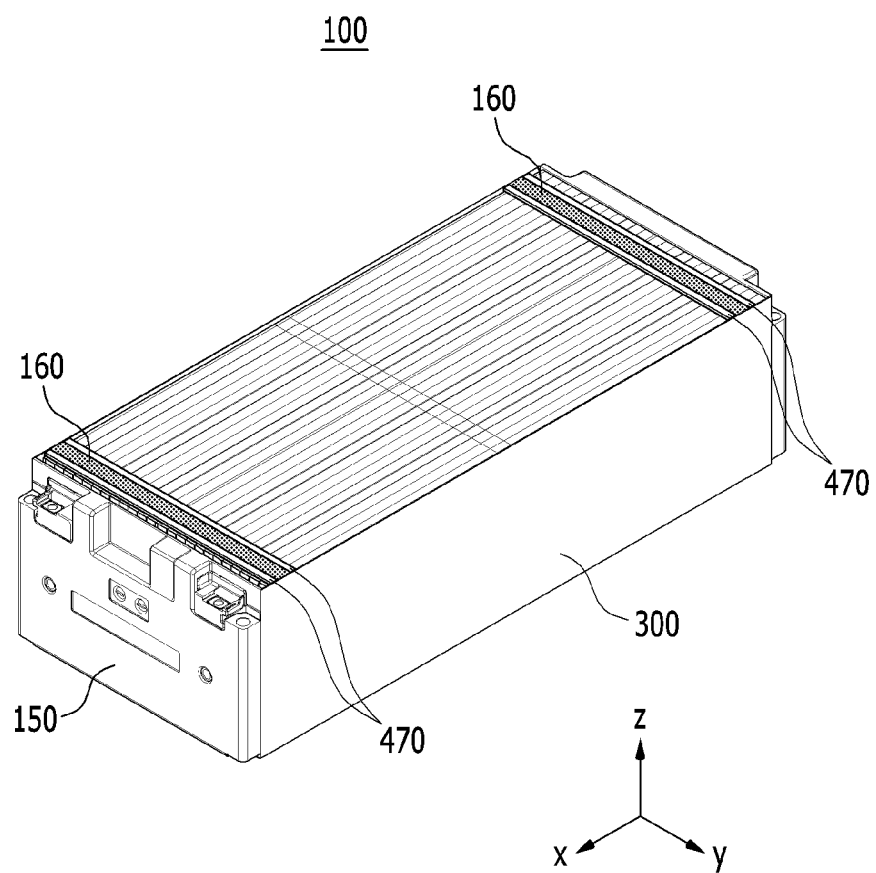

[FIG. 8]
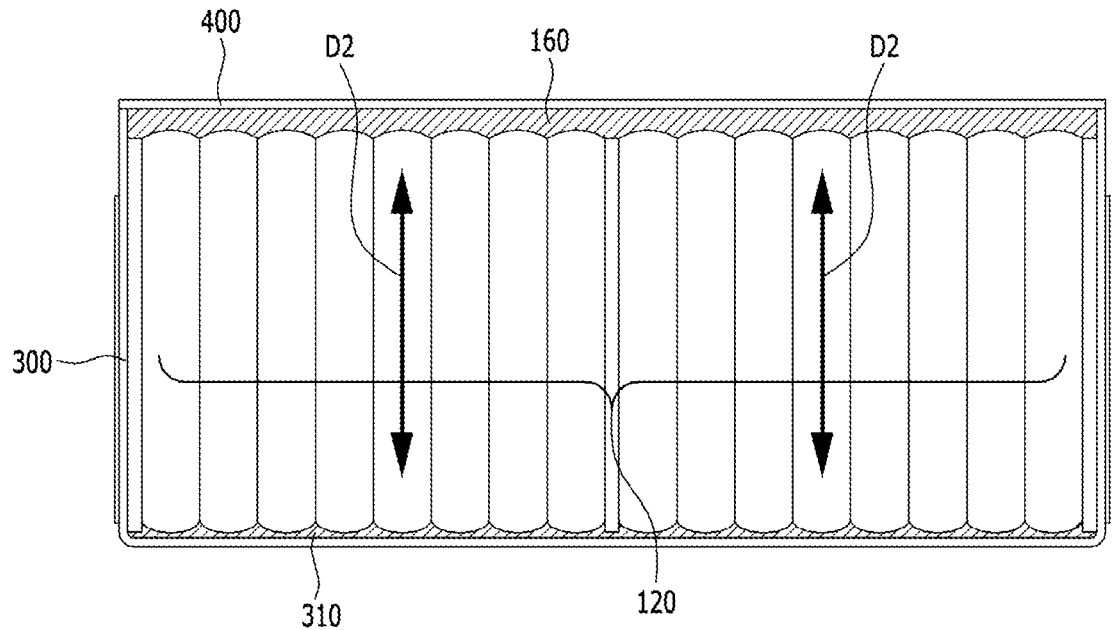
[FIG. 9]
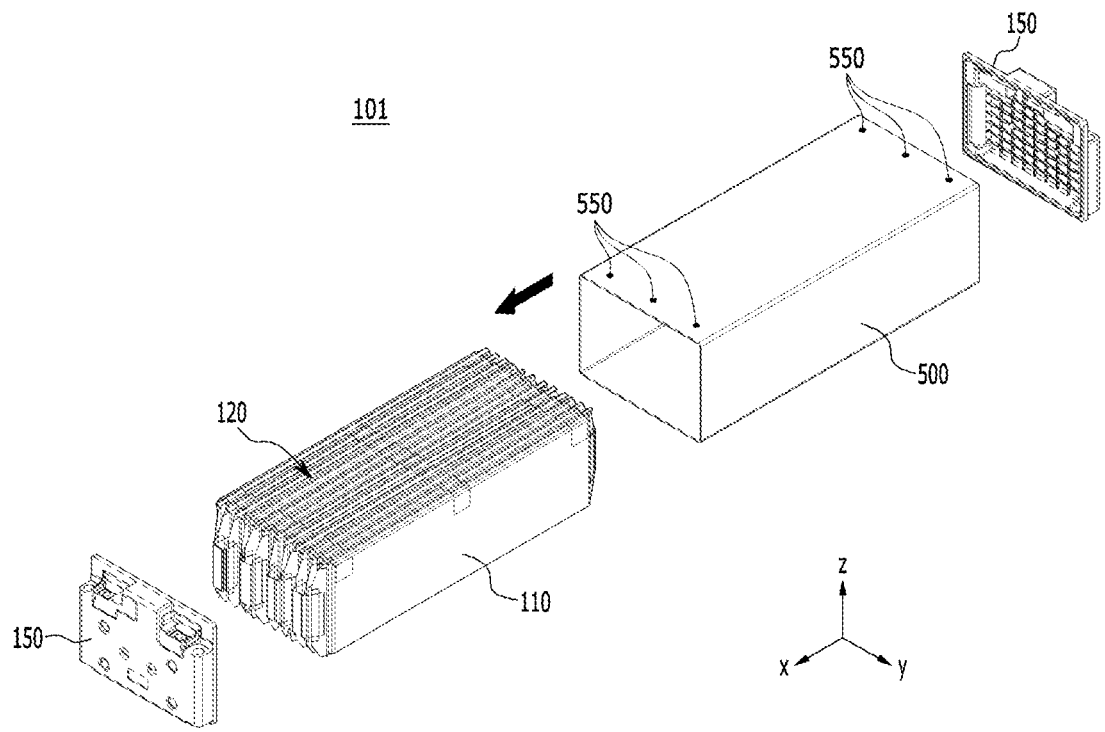

[FIG. 10]
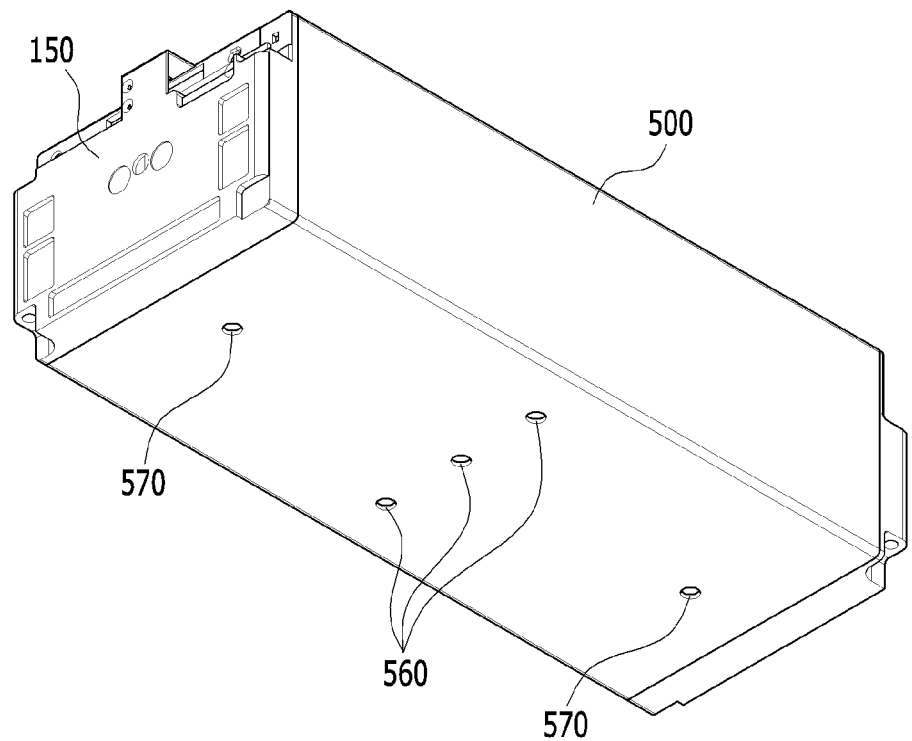

BATTERY MODULE AND BATTERY PACK INCLUDING THE SAME

CROSS CITATION WITH RELATED APPLICATION(S)

This application is a National Phase entry pursuant to 35 U.S.C. § 371 of International Application No. PCT/KR2021/002554, filed on Mar. 2, 2021, and claims priority to and the benefit of Korean Patent Application No. 10-2020-0074749, filed on Jun. 19, 2020 in the Korean Intellectual Property Office, the disclosures of which are incorporated herein by reference in their entirety.

TECHNICAL FIELD

The present disclosure relates to a battery module and a battery pack including the same, and more specifically, to a battery module having improved cooling performance and a battery pack including the same.

BACKGROUND ART

As technology development and demands for mobile devices increase, the demand for batteries as energy sources is rapidly increasing. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas middle- or large-sized devices such as vehicles require high power and large capacity. Therefore, a middle or large-sized battery module in which a large number of battery cells are electrically connected is used.

Preferably, the middle or large-sized battery module is manufactured so as to have as small a size and weight as possible. For this reason, a prismatic battery, a pouch-shaped battery or the like, which can be stacked with high integration and has a small weight relative to capacity, is usually used as a battery cell of the middle or large-sized battery module. Meanwhile, in order to protect the battery cell stack from external impact, heat or vibration, the battery module may include a housing in which a front surface and rear surface are opened to house the battery cell stack in an internal space.

FIG. 1 is an exploded perspective view of a conventional battery module. FIG. 2 is a perspective view showing a state in which the components constituting the battery module of FIG. 1 are combined.

Referring to FIGS. 1 and 2, the conventional battery module 10 includes a battery cell stack 12 in which a plurality of battery cells 11 are stacked in one direction, a housing 20 for the battery cell stack 12, an end plate 15 for covering the front and rear surfaces of the battery cell stack, and busbar frames 13 formed between the end plate 15 and the front and rear surfaces of the battery cell stack 12. The housing 20 includes a lower frame 30 for covering the lower and both side surfaces of the battery cell stack 12, and an upper plate 40 for covering the upper surface of the battery cell stack 12. The battery module 10 can cool heat generated in the battery cell stack 12 because a thermally conductive resin layer 31 is coated onto the bottom surface of the lower frame 30 that covers the lower portion of the battery cell stack 120.

At this time, the thermally conductive resin layer 31 can perform the role of fixing the battery cell stack 12 inside the battery module while transferring heat generated in the battery cell stack 12 to the outside of the battery module 10.

FIG. 3 is a cross-sectional view taken along the cutting line A-A of FIG. 2.

Referring to FIG. 3, the conventional battery module 10 has a structure that cools the lower portion of the battery cell stack 12, which is a structure in which the heat generated from the battery cell 11 flows in a first cooling direction D1 toward the lower portion. However, since the thermally conductive resin layer 31 is formed only at a position corresponding to the lower portion of the battery cell stack 12, the portion of the battery cell 11, which is close to the thermally conductive resin layer 31, has a low temperature, but the portion of the battery cell 11, which is far from the thermally conductive resin layer, has a high temperature, thereby causing a temperature difference inside the battery cell 11. In particular, the temperature rises in the direction toward the upper portion and both end portions of the battery cell 11, and the temperature decreases in the direction toward the lower portion and the central portion of the battery cell 11.

Thus, as a positive electrode and a negative electrode are located at both end portions of the battery cell 11, the both end portions generate a relatively large amount of heat compared to the central portion during the charging/discharging process of the battery module 10. However, the thermally conductive resin layer 31 located at the lower portion of the battery cell 11 does not sufficiently and quickly cool heat generated at both end portions of the battery cell 11 since only the heat transferred from both end portions of the battery cell 11 to the bottom portion is cooled. In particular, considering that the temperature of the battery cell 11 is one of the factors limiting the output of the battery, a local temperature rise occurring in the battery cell 11 is highly likely to limit the output of the battery at an early stage and thus, there is a need to improve the above.

DETAILED DESCRIPTION OF THE INVENTION

Technical Problem

It is an object of the present disclosure to provide having improved cooling performance and a battery pack including the same.

The objects of the present disclosure are not limited to the aforementioned objects, and other objects which are not described herein should be clearly understood by those skilled in the art from the following detailed description and the accompanying drawings.

Technical Solution

According to one embodiment of the present disclosure, there can be provided a battery module comprising: a battery cell stack including a plurality of battery cells stacked in a first direction, a housing for the battery cell stack, a first thermally conductive resin layer located between the battery cell stack and a lower portion of the housing, and a second thermally conductive resin layer located between the battery cell stack and an upper portion of the housing, wherein at least one first injection hole for injecting a thermally conductive resin is formed in the upper portion of the housing.

The at least one first injection hole may be formed at a position adjacent to an upper end of the housing.

The at least one first injection hole may comprise two or more first injection holes which can be formed at a position adjacent to both ends of the upper portion of the housing, and are formed at positions opposite to each other.

The at least two first injection holes may be formed at positions adjacent to one end of the upper portion of the housing, and are located separately from each other in the same direction as the first direction.

The housing may include a U-shaped frame including a bottom portion and two side surface portions connected to both sides of the bottom portion, and an upper plate that covers the battery cell stack mounted on the U-shaped frame, and the battery module may further include at least two blocking pads located on a lower surface of the upper plate, wherein the at least one first injection hole may be located between the at least two blocking pads.

The second thermally conductive resin layer may be formed at a position corresponding to a region between the at least two blocking pads.

The at least two blocking pads may be extended in a direction same as the first direction, and the at least two blocking pads may be protruded in a direction toward the battery cell stack.

The first thermally conductive resin layer may be formed by coating a thermally conductive resin onto the bottom portion (lower frame) of the U-shaped frame.

The battery module may include a housing including an upper portion and a lower portion corresponding to each other, and both side portions corresponding to each other, which house the battery cell stack, and at least one second injection hole may be located at the lower portion of the housing.

The first thermally conductive resin layer may be formed by injecting a thermally conductive resin into the at least one second injection hole.

The at least one second injection hole may be formed at a position corresponding to a central region of the lower surface of the housing.

According to another embodiment of the present disclosure, there can be provided a battery pack comprising the battery module.

Advantageous Effects

According to the embodiments of the present disclosure, a thermally conductive resin layer can be formed at a position corresponding to the upper portion of the battery cell stack, thereby suppressing a local temperature rise inside the battery cell and reducing a temperature difference.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is an exploded perspective view of a conventional battery module.

FIG. 2 is a perspective view showing a state in which components constituting the battery module of FIG. 1 are combined.

FIG. 3 is a cross-sectional view taken along the cutting line A-A of FIG. 2.

FIG. 4 is an exploded perspective view of a battery module according to an embodiment of the present disclosure.

FIG. 5 is a perspective view showing a state in which the components constituting the battery module of FIG. 4 are combined.

FIG. 6 is a perspective view showing a state in which the upper portion of the housing of the battery module of FIG. 4 is turned over in the up and down direction.

FIG. 7 is a perspective view showing a state in which the upper portion of the housing is removed from the battery module of FIG. 4.

FIG. 8 is a cross-sectional view taken along the cutting line B-B of FIG. 4.

FIG. 9 is an exploded perspective view of a battery module according to another embodiment of the present disclosure.

FIG. 10 is a perspective view showing a state in which the battery module of FIG. 9 is turned over in the up and down direction.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

In the following, the battery module according to an embodiment of the present disclosure will be described. However, the description herein is made based on the front surface of the front and rear surfaces of the battery module, without being limited thereto, and even in the case of the rear surface, the same or similar contents may be described.

FIG. 4 is an exploded perspective view of a battery module according to an embodiment of the present disclosure. FIG. 5 is a perspective view showing a state in which the components constituting the battery module of FIG. 4 are combined.

Referring to FIGS. 4 and 5, the battery module 100 according to the present embodiment includes a battery cell stack 120 in which a plurality of battery cells 110 are stacked in a first direction (y-axis), a housing 200 that houses the battery cell stack 120, end plates 150 located at the front surface and the rear surface of the battery cell stack 120, respectively, and a busbar frame 130 located between the battery cell stack 120 and the end plate 150. The housing 200 includes a U-shaped frame 300 of which an upper surface, a front surface and a rear surface are opened, and an upper plate 400 that covers the upper portion of the battery cell stack 120.

The battery module 100 according to this embodiment may be configured such that a first thermally conductive resin layer 310 is located between the battery cell stack 120 and the bottom surface of the U-shaped frame 300. In the first thermally conductive resin layer 310, before the battery cell stack 120 is mounted on the bottom surface of the U-shaped frame 300, a thermally conductive resin can be coated onto the bottom surface of the U-shaped frame 300. Thereafter, the thermally conductive resin can be cured, thereby forming the first thermally conductive resin layer 310. Thereby, the first thermally conductive resin layer 310 can fix the battery cell stack 120 while transferring heat generated from the battery cell 110 to the bottom of the battery module 100.

FIG. 6 is a perspective view showing a state in which the upper portion of the housing of the battery module of FIG. 4 is turned over in the up and down direction. FIG. 7 is a perspective view showing a state in which the upper portion of the housing is removed from the battery module of FIG. 4.

Referring to FIGS. 6 and 7, in the battery module 100 according to the present embodiment, at least one first injection hole 450 can be formed in the upper plate 400 and thus, a thermally conductive resin can be injected into the first injection hole 450. Thereafter, the thermally conductive resin can be cured, thereby forming the second thermally conductive resin layer 160.

The first injection hole 450 may be formed on the upper plate 400. The first injection hole 450 can be formed at a position adjacent to the end part of the upper plate 400. The first injection hole 450 may include at least two injection holes, and the at least two injection holes are adjacent to both ends of the upper plate 400, but may be formed at positions opposite to each other. Further, the first injection holes 450 may be formed at one end part of the upper plate 400, with at least two injection holes being spaced apart from each other. In this case, the first injection holes 450 may be similarly formed in the opposite end part of the upper plate 400, with at least two injection holes being spaced apart from each other.

Referring to the conventional battery cell of FIGS. 1 to 3, the first injection hole 450 may be formed at a position corresponding to a position of the battery cell 110 having the lowest cooling efficiency. Thereby, the second thermally conductive resin layer 160 formed by injecting the thermally conductive resin into the first injection hole 450 may be formed at a position corresponding to a position of the battery cell 110 having the lowest cooling efficiency. Consequently, the battery module 100 according to the present embodiment can improve cooling efficiency of the battery cell 110, and can reduce a temperature difference according to the position of the battery cell 110.

When the first injection holes 450 are formed at one end part of the upper plate 400, with at least two injection holes being spaced apart from each other, the at least two injection holes may be located separately from each other in a direction corresponding to the first direction (y-axis). Thereby, the battery module 100 according to the present embodiment can evenly inject the second thermally conductive resin layer 160 in a direction corresponding to the first direction, as compared with a structure that is injected and formed by one injection hole. Through this, the battery module 100 according to the present embodiment can evenly improve the cooling efficiency of the battery cells 110 regardless of the position of the battery cell stack, and also evenly reduce the temperature difference according to the position of the battery cell 110.

Referring to FIGS. 6 and 7, the battery module 100 according to the present embodiment may be configured such that at least two blocking pads 470 are located on the lower surface of the upper plate 400. At least two blocking pads 470 may be extended in a direction corresponding to the first direction (y-axis). At least two blocking pads 470 may be protruded in a direction corresponding to a direction (z-axis) toward the battery cell stack 120. Preferably, the at least two blocking pads 470 are protruded in a direction corresponding to a direction (z-axis) toward the battery cell stack, and may make contact with the upper portion of the battery cell stack. Therefore, the blocking pads 470 may block the thermally conductive resin injected into the first injection hole 450 from being coated onto a region outside the blocking pads 470.

The first injection hole 450 may be located between at least two blocking pads 470. Thereby, the second thermally conductive resin layers 160 may be formed at a position corresponding to a region between the at least two blocking pads 470. That is, the blocking pads 470 can adjust a region in which the second thermally conductive resin layer 160 can be formed, and also can prevent the thermally conductive resin injected into the first injection hole 450 from being injected into an unnecessary region.

As an example, the region corresponding to the central portion of the battery cell 11 is sufficiently cooled with only the thermally conductive resin layer 31 located at the lower portion. This is because in the embodiment of the present disclosure, it is not necessary to form the second thermally conductive resin layer 160 up to a region corresponding to the central portion of the battery cell 110. Thereby, the blocking pads 470 are more preferably formed at a position adjacent to the region corresponding to both ends of the battery cell 110.

Further, the blocking pads 470 limit the region to which the thermally conductive resin is coated, so that the heat conductive resin can be uniformly coated onto a desired position without going through the additional disassembly and assembly process of the battery module 100. In addition, the blocking pads 470 can reduce the cost loss for the thermally conductive resin injected up to a region where the thermally conductive resin is unnecessary.

FIG. 8 is a cross-sectional view taken along the cutting line B-B of FIG. 4. Referring to FIGS. 4 to 8, a first thermally conductive resin layer 310 is in contact with a lower portion of the battery cell stack 120 included in the battery module 100, and at least a certain region of the upper portion of the battery cell stack 120 can be structured to make contact with the second thermally conductive resin layer 160. Thereby, unlike the conventional battery module 10, the battery module 100 has a structure that cools both the upper portion and the lower portion of the battery cell stack 120, which is a structure in which heat generated from the battery cell stack 12 flows in the second cooling direction D2 directing both the upper portion and the lower portion.

Thereby, unlike the conventional battery module 10, the battery module 100 according to the present embodiment can cool the heat generated in a direction toward the upper portion and both end portions of the battery cell stack 120 via the second thermally conductive resin layer 160. Thereby, the battery module 100 according to the present embodiment can suppress a local temperature rise that occurs at both end portions of the battery cell 110, and can reduce a temperature difference in the battery cell. In addition, it is possible to prevent the output of the battery including the battery cell 110 from being limited at an early stage.

FIG. 9 is an exploded perspective view of a battery module according to another embodiment of the present disclosure. FIG. 10 is a perspective view showing a state in which the battery module of FIG. 9 is turned over in the up and down direction.

Referring to FIGS. 9 and 10, the battery module 101 according to the present embodiment is described based on the same contents as the battery module 100 described in FIGS. 5 to 9, and only different parts will be described in detail.

The battery module 101 according to the present embodiment includes a housing 500, and the housing 500 may have a mono frame structure having upper and lower portions corresponding to each other, and both side portions corresponding to each other which house the battery cell stack 110.

The battery module 101 according to the present embodiment may be configured such that at least one first injection hole 550 is formed in the upper portion of the housing 500, and details of the first injection hole 550 are the same as those of the first injection hole 450 described with reference to FIGS. 5 to 9. Additionally, the battery module 101 according to the present embodiment may be configured such that at least one second injection hole 560 is formed in the lower portion of the housing 500. Here, the at least one second injection hole 560 may be formed at a position corresponding to the central region of the lower portion of the housing 500.

Further, the battery module 101 according to the present embodiment may be configured such that at least one checking hole 570 is formed in the lower portion of the housing 500. At least one checking hole 570 may be formed at a position adjacent to the lower end portion of the housing 500, and may be formed to be spaced apart from the second injection hole 560. Thereby, when the thermally conductive resin injected through the second injection hole 560 is injected more than necessary, the thermally conductive resin may be discharged to the outside of the battery module 101 via the checking hole 570, whereby the injection amount may be adjusted.

However, the housing 500 is not limited thereto, and may be replaced with a frame having a shape in which two L-shaped frames are combined. In this case as well, first injection holes 450 and 550 may be formed on the upper portion of the housing 500, and a thermally conductive resin may be coated in advance onto the lower portion of the housing 500 like a U-shaped frame, or a thermally conductive resin may be injected via a separate injection hole.

Meanwhile, one or more of the battery modules according to the embodiment of the present disclosure can be packaged in a pack case to form a battery pack.

The above-mentioned battery module and a battery pack may be applied to various devices. These devices may be applied to transportation means such as an electric bicycle, an electric vehicle, a hybrid vehicle, but the present disclosure is not limited thereto but can be applied to transportation means such as an electric bicycle, an electric vehicle, a hybrid vehicle, but the present disclosure is not limited thereto and can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
110: battery cell
120: battery cell stack
300: U-shaped frame
400: upper plate
500: mono frame

The invention claimed is:

1. A battery module comprising:
a battery cell stack comprising a plurality of battery cells stacked in a first direction,
a housing for the battery cell stack,
a first thermally conductive resin layer located between the battery cell stack and a lower portion of the housing, and
a second thermally conductive resin layer located between the battery cell stack and an upper portion of the housing,
wherein at least one first injection hole for injecting a thermally conductive resin is formed in the upper portion of the housing,
wherein the housing comprises an upper plate that covers the battery cell stack,
wherein at least two blocking pads are located on a lower surface of the upper plate,
wherein the at least one first injection hole is located between the at least two blocking pads,
wherein the at least two blocking pads are extended in a direction same as the first direction, and
wherein the at least two blocking pads are protruded in a direction toward the battery cell stack.

2. The battery module of claim 1,
wherein the at least one first injection hole is formed at a position adjacent to an upper end of the housing.

3. The battery module of claim 2,
wherein the at least one first injection hole comprises two or more first injection holes which are formed at positions adjacent to both ends of the upper portion of the housing opposite to each other.

4. The battery module of claim 2,
wherein the at least one first injection hole comprises two or more first injection holes which are formed at positions adjacent to one end of the upper portion of the housing, and are located separately from each other in a direction same as the first direction.

5. The battery module of claim 1,
wherein the housing further comprises a U-shaped frame including a bottom portion and two side surface portions connected to both sides of the bottom portion, and
wherein the upper plate mounted on the U-shaped frame.

6. The battery module of claim 5,
wherein the first thermally conductive resin layer is formed by coating a thermally conductive resin onto the bottom portion of the U-shaped frame.

7. The battery module of claim 1,
wherein the second thermally conductive resin layer is formed at a position corresponding to a region between the at least two blocking pads.

8. The battery module of claim 1,
wherein the housing comprises an upper portion and a lower portion corresponding to each other, and both side portions corresponding to each other, which house the battery cell stack, and
at least one second injection hole is located at the lower portion of the housing.

9. The battery module of claim 8,
wherein the first thermally conductive resin layer is formed by injecting the thermally conductive resin into the at least one second injection hole.

10. The battery module of claim 8,
wherein the at least one second injection hole is formed at a position corresponding to a central region of the lower surface of the housing.

11. A battery pack comprising the battery module as set forth in claim 1.

* * * * *